(12) United States Patent
Wang et al.

(10) Patent No.: US 7,965,344 B2
(45) Date of Patent: Jun. 21, 2011

(54) FLAT PANEL DISPLAY WITH PIVOT MECHANISM

(75) Inventors: Te-Hsu Wang, Miao-Li (TW); Ming-Chuan Li, Miao-Li (TW)

(73) Assignee: Chimei Innolux Corporation, Miao-Li County (TW)

( * ) Notice: Subject to any disclaimer, the term of this patent is extended or adjusted under 35 U.S.C. 154(b) by 1416 days.

(21) Appl. No.: 11/446,693

(22) Filed: Jun. 5, 2006

(65) Prior Publication Data

US 2006/0274487 A1    Dec. 7, 2006

(30) Foreign Application Priority Data

Jun. 3, 2005  (TW) .............................. 94209306 U

(51) Int. Cl.
*H04N 7/12* (2006.01)

(52) U.S. Cl. ........ 348/826; 348/836; 348/839; 348/843; 348/790; 312/7.2; 361/679.02; 361/679.61; 248/121; 248/122.1; 248/123.11; 248/123.2; 248/124.1; 248/124.2; 248/125.1; 248/125.2; 248/125.3; 248/125.7; 248/125.8; 248/125.9

(58) Field of Classification Search .................. 348/836, 348/839, 843, 790; 312/7.2; 361/697.02, 361/679.61; 248/121–125.9
See application file for complete search history.

(56) References Cited

U.S. PATENT DOCUMENTS

| | | | |
|---|---|---|---|
| 6,094,340 A | 7/2000 | Min | |
| 6,437,975 B1 | 8/2002 | Huang | |
| 6,587,166 B1 * | 7/2003 | Lee et al. | 349/58 |
| 6,772,983 B1 * | 8/2004 | Liao et al. | 248/291.1 |

* cited by examiner

*Primary Examiner* — Joseph G Ustaris
*Assistant Examiner* — Geepy Pe
(74) *Attorney, Agent, or Firm* — Wei Te Chung

(57) ABSTRACT

An exemplary flat panel display (2) includes a housing (251 and 255) with a pair of joint members (256 and 257), a display panel (253) accommodating in the housing, a base (21) with a supporting member (210), and a pivot mechanism (23) connecting the supporting member and the joint members. The joint members are integrally formed with the housing, whereby the display panel is pivotable relative to the base. With this configuration, the integrated joint members provide the flat panel display with a simple structure, relatively easy assembly, and reduced cost.

20 Claims, 5 Drawing Sheets

FLAT PANEL DISPLAY WITH PIVOT MECHANISM

FIELD OF THE INVENTION

The present invention relates to display devices, and more particularly to a flat panel display having a display module pivotally attached to a base.

BACKGROUND

Display devices have been widely applied to various electronic equipment in which messages or pictures need to be displayed, such as notebook computers and personal computers. Because a typical display device has an optimal viewing angle, it is desirable that the display device can be inclined forward or backward to attain the optimal viewing angle for any particular user.

Referring to FIG. 6, a conventional flat panel display 1 includes a display module 11, a base 12, and a pivot mechanism 13.

The pivot mechanism 13 is rotatably mounted on the base 12 via a hinge 14. A rear housing (not labeled) of the display module 11 and the pivot mechanism 13 respectively define a plurality of corresponding mounting holes 112 and 132 therein. In assembly, the display module 11 is fastened to the pivot mechanism 13 by engaging screws 15 into the corresponding mounting holes 112 and 132. After assembly, the display module 11 may be turned relative to the base 12 via rotating of the hinge 14.

Typically, the pivot mechanism 13 is mainly made of iron or another metallic material, so that the pivot mechanism 13 has enough mechanical strength to support the weight of the display module 11. However, the metallic material needed for the pivot mechanism 13 is relatively costly. In addition, the process of attaching the pivot mechanism 13 to the display module 11 is unduly complicated.

Accordingly, what is needed is a flat panel display that can overcome the above-described deficiencies.

SUMMARY

An exemplary flat panel display includes a housing with a pair of joint members, a display panel accommodating in the housing, a base with a supporting member, and a pivot mechanism connecting the supporting member and the joint members. The joint members are integrally formed with the housing, whereby the display panel is pivotable relative to the base.

With this configuration, the integrated joint members provide the flat panel display with a simple structure, relatively easy assembly, and reduced cost.

Other advantages and novel features will become more apparent from the following detailed description when taken in conjunction with the accompanying drawings.

DETAILED DESCRIPTION OF PREFERRED EMBODIMENTS

Reference will now be made to the drawings to describe preferred and exemplary embodiments of the present invention in detail.

Figure 1:
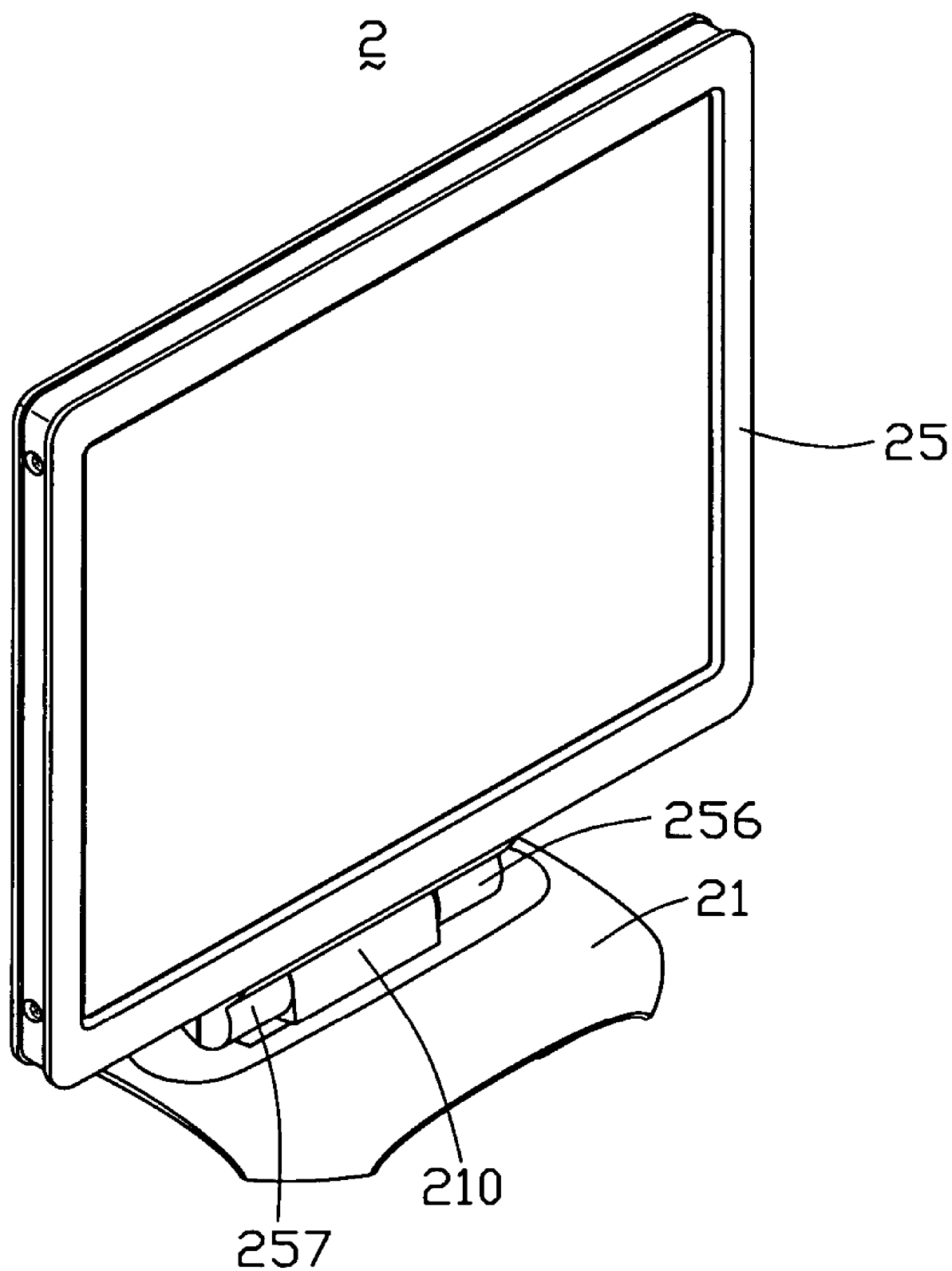
FIG. 1 is a schematic, isometric view of a flat panel display according to an exemplary embodiment of the present invention.

Referring to FIG. 1, a flat panel display 2 includes a display module 25, and a base 21 for supporting the display module 25. The display module 25 may for example be a liquid crystal display (LCD) module, a plasma display module, or a light emitting diode (LED) display module. The display module 25 includes a first joint member 256 and a second joint member 257. The base 21 includes an axle housing 210 at a middle thereof.

Figure 2:
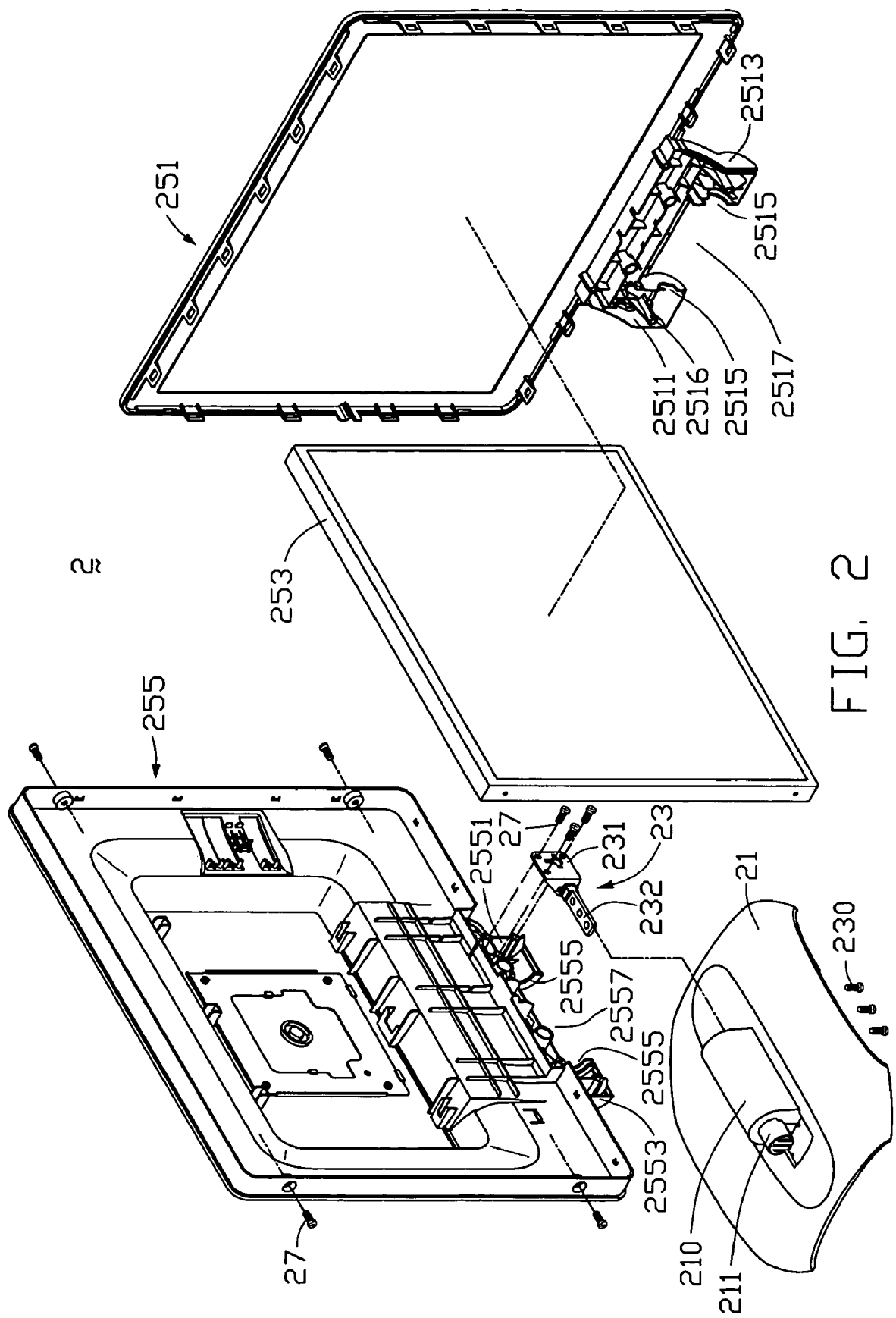
FIG. 2 is an exploded, isometric view of the flat panel display of the exemplary embodiment.

Referring to FIG. 2, this is an exploded, isometric view of the flat panel display 2. The axle housing 210 is integrated with the base 21, and includes a supporting axle 211 and a blind hole (not shown) at two opposite ends thereof respectively.

Figure 5:
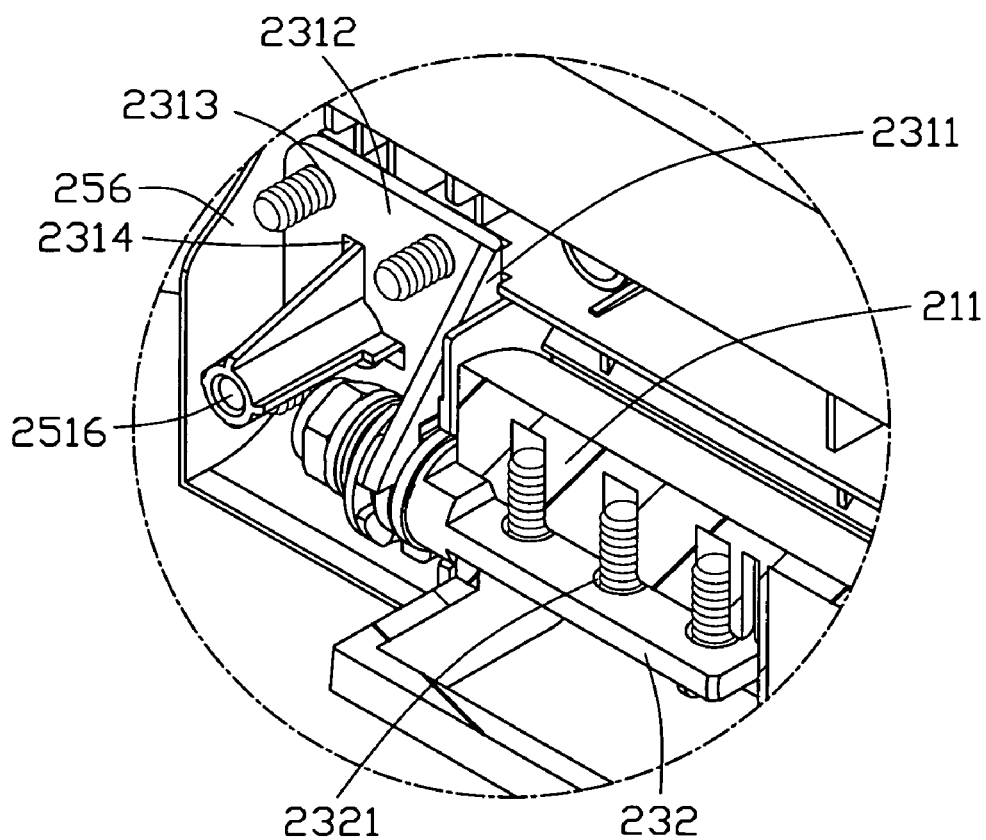
FIG. 5 is an enlarged view of a circled portion V of FIG. 3.
Figure 6:
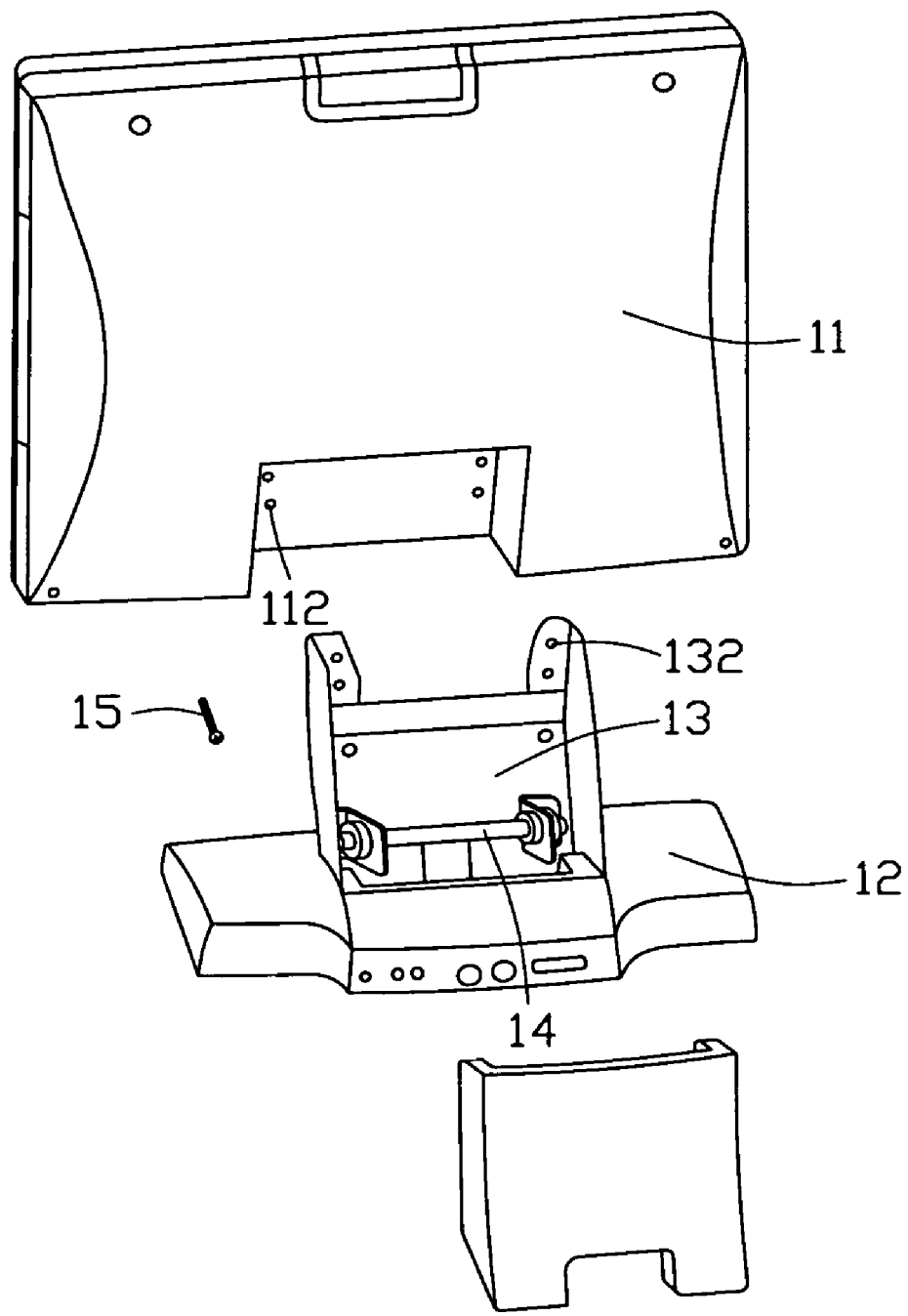
FIG. 6 is an exploded, isometric, back view of a conventional flat panel display.

The flat panel display 2 further includes a pivot mechanism 23, which includes a frame 231 and a shaft 232. Also referring to FIG. 5, the frame 231 is generally L-shaped, with a first plate 2311 and a second plate 2312 substantially perpendicularly adjoining each other. The first plate 2311 defines a hole (not labeled) therein, for rotatably receiving an end of the shaft 232. The second plate 2312 defines three lock holes 2313, and a generally cross-shaped cutout 2314. The shaft 232 defines three lock holes 2321 therein.

The display module 25 includes a front frame 251, a display panel 253, and a rear frame 255. The front and rear frames 251 and 255 can be fixed together through a plurality of screws 27, thus defining a housing with a space therebetween for accommodating the display panel 253 therein. The front frame 251 includes a first claw 2511 and a third claw 2513 extending out from a bottom edge of a main body thereof. The first and third claws 2511 and 2513 are integrally formed with the main body of the front frame 251. The first and third claws 2511 and 2513 are spaced apart, thereby defining an opening 2517 therebetween. The first and third claws 2511 and 2513 each defines a notch 2515 therein, the notch 2515 being adjacent to the opening 2517. Thus the notches 2515 of the first and third claws 2511, 2513 face each other across the opening 2517. The first claw 2511 includes an internal positioning post 2516 that points toward the rear housing 255. The rear frame 255 includes a second claw 2551 and a fourth claw 2553 extending out from a bottom edge of a main body thereof. The second and fourth claws 2551 and 2553 are integrally formed with the main body of the rear frame 255. The second and fourth claws 2551 and 2553 are spaced apart, thereby defining an opening 2557 therebetween. The second and fourth claws 2551 and 2553 each defines a notch 2555 therein, the notch 2555 being adjacent to the opening 2557. Thus the notches 2555 of the second and fourth claws 2551, 2553 face each other across the opening 2557. The second claw 2551 corresponds to the first claw 2511, and the fourth claw 2553 corresponds to the third claw 2513.

Figure 3:
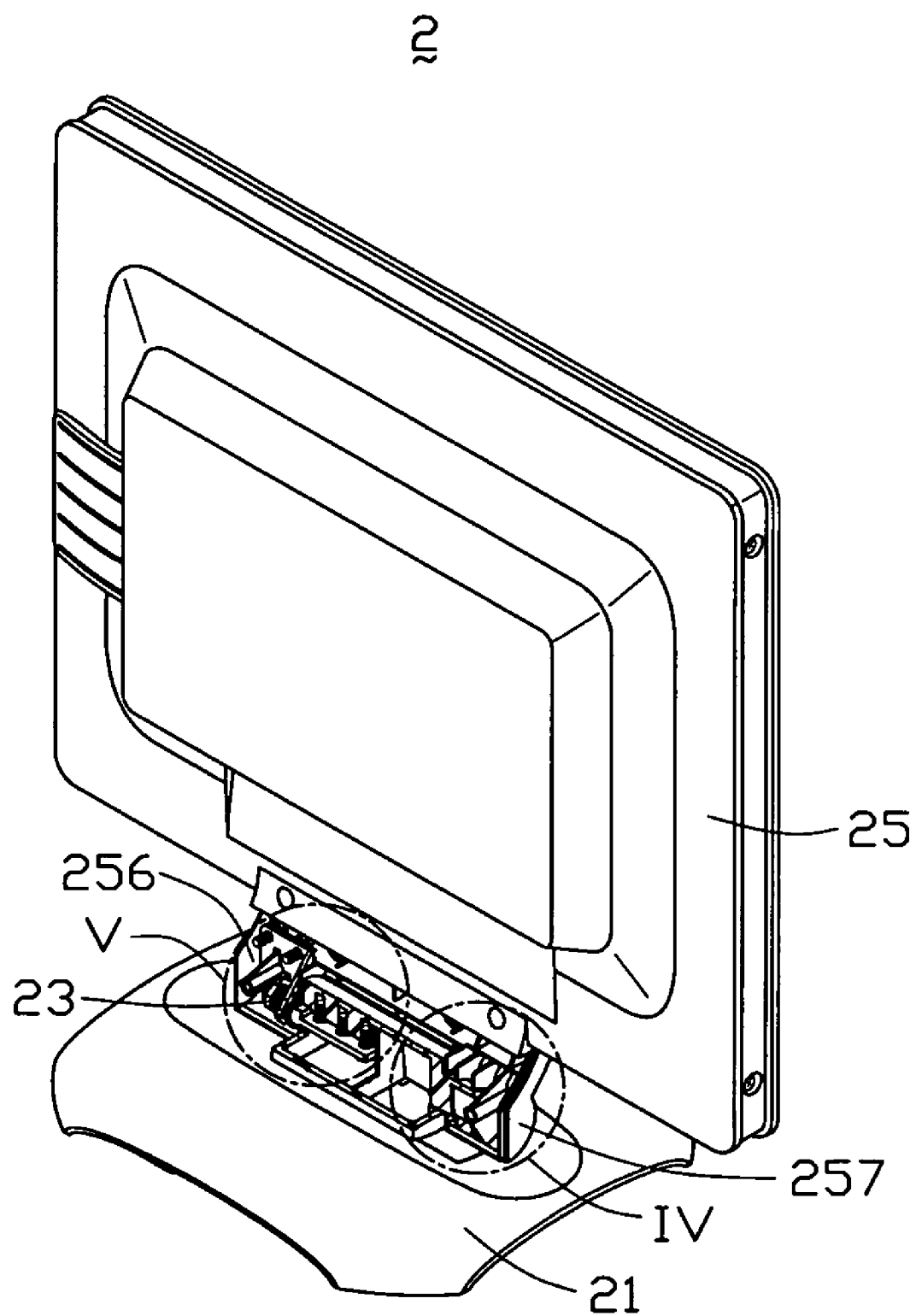
FIG. 3 is an isometric, back, cutaway view of the flat panel display of the exemplary embodiment.
Figure 4:
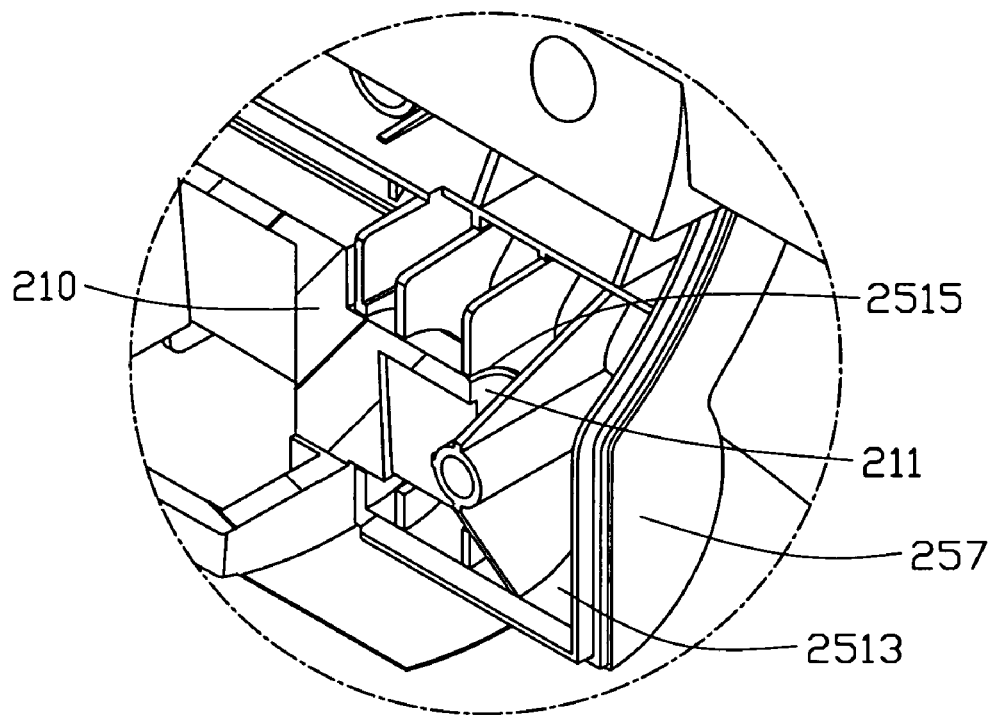
FIG. 4 is an enlarged view of a circled portion IV of FIG. 3.

Also referring to FIGS. 3-4, in assembly, firstly, the shaft 232 of the pivot mechanism 23 is inserted into the blind hole of the axle housing 210 of the base 21. The shaft 232 is fastened therein by inserting three screws 27 up through a bottom of the axle housing 210 and engaging the screws 27 in the three lock holes 2321 of the shaft 232. Secondly, the frame 231 is fixed to the second claw 2551 of the rear frame 255.

Three screws 27 are inserted through the lock holes 2313 of the second plate 2312 of the frame 231, and engaged in three posts (FIG. 2, not labeled) of the second plate 2312. Thus the rear frame 255 is arranged on the base 21. In particular, the axle housing 210 is contained in the opening 2557, the notch 2555 of the second claw 2551 receives a corresponding part of the pivot mechanism 23, and the notch 2555 of the fourth claw 2553 receives a corresponding part of the supporting axle 211. Thirdly, the front frame 251 is arranged on the base 21, and cooperates with the rear frame 255 to form the housing with the space accommodating the display panel 253 therein. In particular, the positioning post 2516 is inserted into the cross-shaped cutout 2314. The first claw 2511 is mated with the second claw 2551, for example by using adhesive, to cooperatively form the first joint member 256. The first joint member 256 contains the frame 231, with the notches 2515, 2555 of the first and second claws 2511, 2551 to cooperatively receiving a corresponding part of the pivot mechanism 23. The third claw 2513 is mated with the fourth claw 2553, for example by using adhesive, to cooperatively form the second joint member 257. The second joint member 257 contains the supporting axle 211, with the notches 2515, 2555 of the third and fourth claws 2513, 2553 cooperatively receiving a corresponding part of the supporting axle 211. Finally, four screws 27 are inserting through sides of the front and rear frames 251, 255 and the display panel 253 to tightly fix the display module 25 into a unified whole that is pivotably attached to the base 21.

After assembly, the shaft 232 of the pivot mechanism 23 is fixed in the axle housing 210, and the frame 231 may be rotated relative to the shaft 232. The positioning post 2516 is engaged in the cross-shaped cutout 2314 of the second plate 2312 of the frame 231. Therefore, a user may manually adjust an angle of the display module 25 relative to the base 21, with the frame 231 rotating relative to the shaft 232 during such adjustment. Friction between a variety of components (not labeled) of the pivot mechanism 23 is such that the user can rotate the display module 25 to a desired angle, and when the desired angle is reached the display module 25 simply stays secured in the desired position and does not move.

Advantageously, the joint members 256 and 257 are integrally formed with the front and rear frames 251 and 255 respectively. Unlike in a conventional flat panel display, there is no separate pivot mechanism made of iron and requiring attachment to the display module. That is, the integrated joint members 256 and 257 provide the flat panel display 2 with a simple structure, relatively easy assembly, and reduced cost.

In further and/or alternative embodiments, the first and second claws 2511 and 2551, and the third and fourth claws 2513 and 2553, may be fixed together with fasteners such as screws. This enhances the mechanical strength and integrity of the display module 25.

It is to be understood, however, that even though numerous characteristics and advantages of the present embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A flat panel display, comprising:
   a housing comprising at least one joint member integrally formed therewith;
   a display panel accommodated in the housing;
   a base with a supporting member, the supporting member comprising a blind hole at an end thereof; and
   a pivot mechanism interconnecting the supporting member and the at least one joint member, whereby the display panel is pivotable relative to the base, the pivot mechanism comprising a shaft inserted into the blind hole;
   wherein the shaft comprises at least one securing hole, and the shaft is fixed to the supporting member via at least one fastener inserted through a bottom of the supporting member and engaged in the at least one securing hole.

2. The flat panel display as claimed in claim 1, wherein the pivot mechanism further comprises a frame, and an end of the shaft outside the supporting member is rotatably connected with the frame.

3. The flat panel display as claimed in claim 2, wherein the frame is fixed to the at least one joint member.

4. The flat panel display as claimed in claim 3, wherein the at least one joint member comprises at least one positioning post, the frame defines a cross-shaped cutout, and the positioning post is received in the cross-shaped cutout thereby facilitating the fixing of the at least one joint member to the frame.

5. The flat panel display as claimed in claim 1, wherein the housing comprises a front frame and a rear frame, the two frames cooperatively form a space therebetween, and the display panel is accommodated in the space.

6. The flat panel display as claimed in claim 5, wherein the front frame comprises at least one claw, and the rear frame comprises at least one claw corresponding to the at least one claw of the front frame.

7. The flat panel display as claimed in claim 6, wherein the at least one claw of the front frame and at least one claw of the rear frame cooperatively form the at least one joint member.

8. The flat panel display as claimed in claim 4, wherein the at least one joint member defines a space contain the frame.

9. The flat panel display as claimed in claim 7, wherein the supporting member further comprises a supporting axle at another end thereof opposite to the end at which the blind hole is, and the at least one joint member defines a space receiving at least part of the supporting axle.

10. The flat panel display as claimed in claim 5, wherein the at least one claw of the front frame is a first claw and a third claw, and the at least one claw of the rear frame is a second claw and a fourth claw.

11. The flat panel display as claimed in claim 10, wherein the at least one joint member is two joint members, the first and second claws cooperatively form a first one of the joint members, the third and fourth claws cooperatively form a second one of the joint members, the first joint member is fixed to the pivot mechanism, and the second joint member is movably connected with the supporting member.

12. A flat panel display, comprising:
   a housing comprising at least one joint member integrally formed therewith along an edge in a longitudinal direction;
   a display panel retained to the housing;
   a base being much shorter than the housing in said longitudinal direction and defining a supporting member, the supporting member comprising a blind hole at an end thereof; and
   a pivot mechanism including a shaft inserted into the blind hole and a frame, the frame connected to an end of the shaft outside the supporting member and rotatable relative to the shaft about an axial direction defined by the shaft;
   wherein the shaft comprises at least one securing hole, and the shaft is fixed to the supporting member via at least one fastener inserted through a bottom of the supporting member to be engaged in the at least one securing hole.

13. The flat panel display as claimed in claim 12, wherein the frame defines a cutout, the at least one joint member comprises a positioning post, and the frame is fixed to the at least one joint member by the cutout receiving the positioning post.

14. The flat panel display as claimed in claim 13, wherein the supporting member further comprises a supporting axle at another end thereof opposite to the end at which the blind hole is.

15. The flat panel display as claimed in claim 14, wherein the at least one joint member is two joint members spaced apart to define an opening therebetween, and the supporting axle of the supporting member is received in one joint member and the frame of the pivot mechanism is received in the other joint member to allow the supporting member at the opening to connect the two joint members along the axial direction defined by the shaft.

16. The flat panel display as claimed in claim 15, wherein the housing comprises a front frame and a rear frame, the two frames cooperatively form a space therebetween, and the display panel is accommodated in the space.

17. The flat panel display as claimed in claim 16, wherein the two joint members each comprises two halves respectively disposed at the front frame and the rear frame to allow assembly of the joint members through a transverse direction which is perpendicular to the axial direction defined by the shaft.

18. The flat panel display as claimed in claim 2, wherein the supporting member further comprises a supporting axle at another end thereof opposite to the end at which the blind hole is.

19. The flat panel display as claimed in claim 18, wherein the at least one joint member is two joint members spaced apart from each other, one joint member receives the frame of the pivot mechanism, and the other joint member receives the supporting axle of the supporting member.

20. The flat panel display as claimed in claim 19, wherein the frame is fixed to and received in said one joint member, and the supporting axle is movably received in said other joint member.

* * * * *